H. P. KRAFT.
PUMP COUPLING OR THE LIKE.
APPLICATION FILED JUNE 30, 1917.

1,384,197.

Patented July 12, 1921.

WITNESSES:
Rene Spuire
D. B. Wallace

INVENTOR
Henry P. Kraft
By Attorneys,
Fraser Swick & Myers

UNITED STATES PATENT OFFICE.

HENRY P. KRAFT, OF RIDGEWOOD, NEW JERSEY.

PUMP-COUPLING OR THE LIKE.

1,384,197.　　　　　　　Specification of Letters Patent.　　Patented July 12, 1921.

Application filed June 30, 1917. Serial No. 178,027.

*To all whom it may concern:*

Be it known that I, HENRY P. KRAFT, a citizen of the United States of America, residing at Ridgewood, in the county of Bergen and State of New Jersey, have invented certain new and useful Improvements in Pump-Couplings or the like, of which the following is a specification.

This invention relates to pump couplings or the like and aims to provide certain improvements therein. Such couplings are usually provided with a swiveled member at the bottom which is screwthreaded on its interior and which is adapted to engage the nipple of a tire valve to attach the coupling thereto. The screwing down of the swiveled member carries with it the body of the coupling and compresses the packing of the latter against the end of the valve nipple. Such packings are necessarily of greater diameter than the screwthreaded aperture through the swivel and cannot be successfully removed through such aperture. As the swivel is permanently attached, there has been practically no way of renewing the packing when the latter wears out.

According to the present invention I provide means for permitting the renewal of the packing so that the length of life of the body of the coupling is greatly increased.

The invention also includes certain other features of construction which will be hereinafter more fully described.

In the drawings, wherein I have shown several forms of the invention,—

Figure 1:
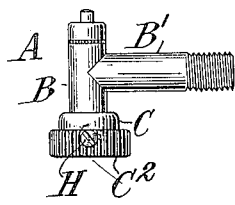
Figure 1 is an elevation of one form of coupling.

Referring to the drawings, let A indicate the coupling as a whole which is usually made with a portion B which is adapted to be screwed on a tire valve by the swiveled sleeve C. The inner end D of the latter is usually spun over a shoulder E on the body B. The body B carries the usual packing F which is pressed down against the top of the tire valve nipple G when the swiveled sleeve is screwed on the latter. In many couplings the body is provided with a right-angled branch B' adapted to be connected with the pump tube. The body B and branch B' are formed with appropriate bores through which air is led to the valve.

According to prior practice it has been customary to screwthread the swiveled sleeve C on its interior so that it directly engages the valve nipple G. The screwthreaded bore thus formed in the sleeve is, of course, of less diameter than the packing F and this has made it very difficult to remove the packing and replace it in case it is worn.

Figure 2:
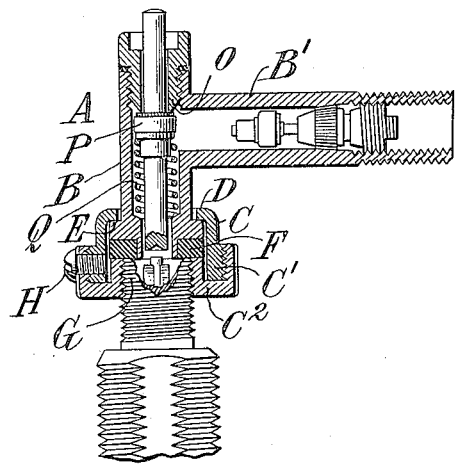
Fig. 2 is a diametrical section of Fig. 1 shown as applied to the tire valve.

According to the present invention I make the sleeve C in two or more parts, one of which is removable to permit the insertion and withdrawal of the packing F. This may be accomplished in various ways. As shown in Figs. 1 and 2, I construct the swiveled member in two parts, $C'$, $C^2$, the lower of which, $C^2$, carries the screwthread to engage the nipple G. The part $C'$ has an internal diameter sufficient to permit the introduction of the packing F when the part $C^2$ is removed. The parts $C'$ $C^2$ may be connected together in any suitable way, as by threading an interior wall of the part $C^2$ and an exterior wall of the part $C'$ and screwing the two parts together. In order to prevent the parts becoming loosened in use, I may introduce a set screw, such as H, which passes through both parts and holds them firmly connected, yet is easily movable to permit disconnection of the parts and renewal or repair of the packing F.

Figure 3:
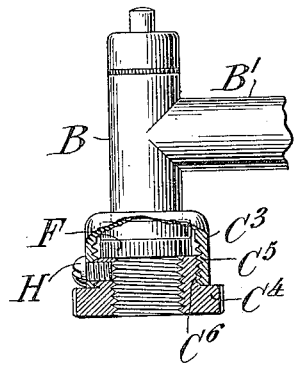
Fig. 3 is an elevation partly in section showing a similar form.

In Fig. 3 the swivel is constructed in two parts,—$C^3$ $C^4$, which are threaded together by an interior screw-thread $C^5$ formed in the upper part which engages an exterior thread $C^6$ formed in the lower part. The lower part is interiorly screwthreaded as before to engage the valve nipple.

Figure 4:
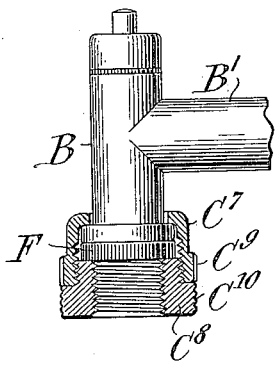
Fig. 4 is a similar view illustrating another modification.

In Fig. 4 I have illustrated a construction in which the set screw is omitted. In this construction both the parts $C^7$ $C^8$ are knurled, as shown at $C^9$ $C^{10}$ respectively. By this means, when the coupling is applied, both parts will normally be manipulated by the fingers of the user and there will be little tendency to loosen the connection.

In ordinary pump couplings, the part B will be closed at its top. The invention is, however, equally applicable to other forms of coupling, such, for instance, as that set forth in the application of M. C. Schweinert, filed October 26, 1915, Serial No. 57,943, which is also shown herein. In this construction a valve seat O is provided at the top of the coupling which is normally closed by a valve P under the pressure of a spring Q and under the air pressure which flows in through the branch B'. When it is desired to read the pressure in the tire, a gage is pressed down on top of the coupling, thus depressing the valve P which in turn depresses the pin of the tire valve.

While I have shown and described one form of the invention, it will be understood that I do not wish to be limited thereto, since various changes may be made therein without departing from the spirit of the invention. Thus, any two-part construction capable of being disassembled to permit the introduction of the washer would come within the purview of the invention. It will also be understood that the invention is applicable in those constructions where the sleeve is not swiveled, but is a solid part of the coupling.

What I claim is:—

1. A coupling comprising a body and a member adapted to engage a valve or the like swiveled to said body, a packing washer between said body and swiveled member, said swiveled member being made in two separable parts, which when connected overlies said washer and retain it in place, and which when separated permit the removal and replacement of said washer, and one of said parts being screw-threaded to engage a tire valve and having a manipulating part or surface thereon, adapted to be grasped in connecting and disconnecting the coupling, and means for normally preventing the separation of the parts of the swiveled member.

2. A coupling comprising a body and a member adapted to engage a valve or the like swiveled to said body, a packing washer between said body and swiveled member, said swiveled member being made in two separable parts, which when connected overlie said washer and retain it in place, and which when separated permit the removal and replacement of said washer, and one of said parts being screw-threaded to engage a tire valve and having a manipulating part or surface thereon adapted to be grasped in connecting and disconnecting the coupling, and means for normally preventing the separation of the parts of the swiveled member, the manipulating part having a greater external and lesser internal diameter than said other part of the swiveled member.

3. A coupling comprising a body and a member adapted to engage a valve or the like swiveled to said body, a packing washer between said body and swiveled member, said swiveled member being made in two separable parts, which when connected overlie said washer and retain it in place, and which when separated permit the removal and replacement of said washer, and one of said parts being screw-threaded to engage a tire valve and having a manipulating part or surface thereon, adapted to be grasped in connecting and disconnecting the coupling, said latter part having a greater external and lesser internal diameter than said other part of the swiveled member.

In witness whereof, I have hereunto signed my name.

HENRY P. KRAFT.